United States Patent
Su

(10) Patent No.: US 12,500,315 B2
(45) Date of Patent: Dec. 16, 2025

(54) BATTERY CELL, BATTERY, ELECTRIC APPARATUS, MANUFACTURING METHOD OF BATTERY CELL, AND MANUFACTURING APPARATUS OF BATTERY CELL

(71) Applicant: CONTEMPORARY AMPEREX TECHNOLOGY (HONG KONG) LIMITED, Hong Kong (CN)

(72) Inventor: Huasheng Su, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 1029 days.

(21) Appl. No.: 17/559,928

(22) Filed: Dec. 22, 2021

(65) Prior Publication Data
US 2022/0416373 A1 Dec. 29, 2022

Related U.S. Application Data

(63) Continuation of application No. PCT/CN2021/103206, filed on Jun. 29, 2021.

(51) Int. Cl.
*H01M 50/54* (2021.01)
*H01M 10/04* (2006.01)
(Continued)

(52) U.S. Cl.
CPC .......... *H01M 50/54* (2021.01); *H01M 10/04* (2013.01); *H01M 50/169* (2021.01);
(Continued)

(58) Field of Classification Search
CPC ............. H01M 10/04; H01M 2220/20; H01M 50/103; H01M 50/107; H01M 50/147;
(Continued)

(56) References Cited

U.S. PATENT DOCUMENTS

2010/0159307 A1* 6/2010 Mao .................. H01M 50/3425
429/185

FOREIGN PATENT DOCUMENTS

CN 104466077 A 3/2015
CN 109103393 A 12/2018
(Continued)

OTHER PUBLICATIONS

International Search Report and Written Opinion dated Mar. 14, 2022 received in International Application No. PCT/CN2021/103206.

(Continued)

*Primary Examiner* — Lingwen R Zeng
(74) *Attorney, Agent, or Firm* — Scully, Scott, Murphy & Presser, P.C.

(57) ABSTRACT

The present application provides a battery cell, a battery, an electric apparatus, a manufacturing method and apparatus of a battery cell. Where the battery cell includes an electrode assembly, a pressure relief mechanism, and an end cover. A concave part on the end cover is recessed from one side, away from the electrode assembly, of the end cover, and the concave part is configured to accommodate at least a part of the pressure relief mechanism. The pressure relief mechanism covers the first welding part in a thickness direction of the end cover, and the dimension of the pressure relief mechanism in the direction perpendicular to the thickness direction of the end cover would not be limited by the first welding part, thus the dimensions of the concave part and the pressure relief mechanism may be appropriately increased to improve the pressure relief capacity of the pressure relief mechanism.

17 Claims, 5 Drawing Sheets

(51) Int. Cl.
  *H01M 50/169* (2021.01)
  *H01M 50/30* (2021.01)
  *H01M 50/103* (2021.01)
  *H01M 50/107* (2021.01)
  *H01M 50/147* (2021.01)
  *H01M 50/148* (2021.01)
  *H01M 50/15* (2021.01)
  *H01M 50/152* (2021.01)
  *H01M 50/184* (2021.01)
  *H01M 50/342* (2021.01)
  *H01M 50/578* (2021.01)

(52) U.S. Cl.
  CPC .......... *H01M 50/30* (2021.01); *H01M 50/103* (2021.01); *H01M 50/107* (2021.01); *H01M 50/147* (2021.01); *H01M 50/148* (2021.01); *H01M 50/15* (2021.01); *H01M 50/152* (2021.01); *H01M 50/184* (2021.01); *H01M 50/3425* (2021.01); *H01M 50/578* (2021.01); *H01M 2220/20* (2013.01); *Y02E 60/10* (2013.01); *Y02P 70/50* (2015.11)

(58) Field of Classification Search
  CPC .. H01M 50/148; H01M 50/15; H01M 50/152; H01M 50/169; H01M 50/184; H01M 50/30; H01M 50/3425; H01M 50/54; H01M 50/578; Y02E 60/10; Y02P 70/50
  See application file for complete search history.

(56) References Cited

FOREIGN PATENT DOCUMENTS

| | | |
|---|---|---|
| CN | 111564577 A | 8/2020 |
| CN | 111653710 A | 9/2020 |
| CN | 112151732 A | 12/2020 |
| CN | 112713345 A | 4/2021 |
| JP | 2013-187172 A | 9/2013 |
| JP | 2016051656 A | 4/2016 |

OTHER PUBLICATIONS

Notification to Grant Patent Right for Invention dated Sep. 24, 2023 received in Chinese Patent Application No. CN 202180013967.1.

* cited by examiner

BATTERY CELL, BATTERY, ELECTRIC APPARATUS, MANUFACTURING METHOD OF BATTERY CELL, AND MANUFACTURING APPARATUS OF BATTERY CELL

CROSS-REFERENCE TO RELATED APPLICATIONS

This application is a continuation of International Application No. PCT/CN2021/103206, filed on Jun. 29, 2021, the disclosure of which is hereby incorporated by reference in its entirety.

TECHNICAL FIELD

The present application relates to the technical field of batteries, in particular to a battery cell, a battery, an electric apparatus, a manufacturing method of a battery cell, and a manufacturing apparatus of a battery cell.

BACKGROUND

The battery is extensively applied to electronics, such as mobile phones, notebook computers, electric bicycles, electric vehicles, electric airplanes, electric ships, electric toy vehicles, electric toy ships, electric toy airplanes, electric tools, and the like.

In the battery technology, both the battery performance and the battery safety need to be considered. Thus, how to improve the battery safety is one problem demanding prompt solution in the battery technology.

SUMMARY

The embodiments of the present application provide a battery cell, a battery, an electric apparatus, a manufacturing method of a battery cell, and a manufacturing apparatus of a battery cell. The safety of the battery cell can be effectively improved.

In a first aspect, the embodiments of the present application provide a battery cell, which includes an electrode assembly with a first tab; a housing with an opening, the housing being configured to accommodate the electrode assembly; a pressure relief mechanism for being actuated when an internal pressure or temperature of the battery cell reaches a threshold value, thus releasing the internal pressure; an end cover for covering the opening, where the end cover is provided with a concave part, the concave part is recessed from one side, away from the electrode assembly, of the end cover along a direction facing the electrode assembly, and the concave part is configured to accommodate at least a part of the pressure relief mechanism; where the end cover is provided with a connecting part at the bottom of the concave part, the connecting part is configured to be welded to the first tab to form a first welding part, and the pressure relief mechanism covers the first welding part in a thickness direction of the end cover.

In above technical solution, the end cover is provided with the connecting part at the bottom of the concave part, the connecting part is welded to the first tab to form the first welding part, the pressure relief mechanism covers the first welding part in the thickness direction of the end cover, thus the first welding part and the pressure relief mechanism are distributed in the thickness direction of the pressure relief mechanism; the dimension of the pressure relief mechanism in a direction perpendicular to the thickness direction of the end cover would not be limited by the first welding part, thus the dimensions of the concave part and the pressure relief mechanism may be appropriately increased according to demands, the pressure relief capacity of the pressure relief mechanism is favorably improved, and the safety of the battery cell is improved.

In some embodiments, the end cover includes a cover main body for covering the opening, where, in the thickness direction, the cover main body is provided with a first outer surface and a first inner surface which are oppositely arranged, and the concave part is recessed from the first outer surface along a direction facing the electrode assembly; and a convex part located at a position where the cover main body corresponds to the concave part, the convex part protruding from the first inner surface along a direction facing the electrode assembly, where, in the thickness direction, the convex part is provided with an abutting surface facing the electrode assembly, a bottom surface of the concave part is opposite to the abutting surface, the abutting surface is for abutting against the first tab, and the connecting part is formed between the abutting surface and the bottom surface.

In above technical solution, the convex part is located at the position where the cover main body corresponds to the concave part, and protrudes from the first inner surface along the direction facing the electrode assembly, and the convex part may play a role in enhancing a position where the cover main body is provided with the concave part. The connecting part for being welded to the first tab is formed between the abutting surface of the convex part and the bottom surface of the concave part, the abutting surface may keep good contact with the first tab when the connecting part is welded to the first tab, thus improving an open area between the first tab and the end cover.

In some embodiments, in the thickness direction, the bottom surface is closer to the electrode assembly than the first inner surface; or the bottom surface is flush with the first inner surface.

In above technical solution, the bottom surface is closer to the electrode assembly in the thickness direction of the end cover or the bottom surface is flush with the first inner surface; on the one hand, the depth of concavity of the concave part is increased, and thus a space of the concave part for accommodating the pressure relief mechanism is increased; on the other hand, the distance from the abutting surface of the convex part to the bottom surface of the concave part is relatively small, i.e., the thickness of the connecting part is relatively small, thus the connecting part is welded to the first tab conveniently from the outside of the end cover, and the firmness of the connecting part and the first tab after welding is improved.

In some embodiments, the pressure relief mechanism is welded to the end cover to form a second welding part, the second welding part is located at an outer side of the first welding part along a first direction, and the first direction is perpendicular to the thickness direction.

In above technical solution, the second welding part formed by welding the pressure relief mechanism to the end cover is located at the outer side of the first welding part along a first direction perpendicular to the thickness direction of the end cover, thus the first welding part and the second welding part are free of overlapping in the thickness direction of the end cover; when the pressure relief mechanism and the end cover are welded, no second welding can be formed at a position where the first welding part is located, the situation that firmness of the first connecting part and the first tab after welding is affected due to damage of the first welding part caused by second welding is avoided.

In some embodiments, the pressure relief mechanism includes a fixing part and a pressure relief part; an outer circumferential wall of the fixing part is welded to an inner circumferential wall of the concave part to form the second welding part; and the pressure relief part is configured to be actuated when the internal pressure or temperature of the battery cell reaches a threshold value, thus releasing the internal pressure.

In above technical solution, the pressure relief part of the pressure relief mechanism is configured to release the internal pressure of the battery cell, and the fixing part of the pressure relief part is configured to be fixedly welded to the end cover. Due to the fact that the outer circumferential wall of the fixing part is welded to the inner circumferential wall of the concave part to form the second welding part, the second welding part is far away from the pressure relief part, the risk of damaging the pressure relief part in the process of welding the fixing part to the end cover is reduced.

In some embodiments, the thickness of the fixing part is greater than that of the pressure relief part.

In above technical solution, the thickness of the fixing part is greater than that of the pressure relief part, thus the pressure relief part can be conveniently actuated to release the internal pressure of the battery cell.

In some embodiments, the fixing part is integrally located at the outer side of the first welding part, in the thickness direction, the pressure relief part covers the first welding part, and the pressure relief part and the first welding part are arranged along the thickness direction in a spaced manner.

In above technical solution, the pressure relief part covers the first welding part in the thickness direction of the end cover, and the pressure relief part and the first welding part are arranged along the thickness direction in a spaced manner; such structure makes that the pressure relief mechanism is prevented from being interfered by the first welding part in the process of welding the fixing part and the end cover, and the welding quality of the outer circumferential wall of the fixing part and the inner circumferential wall of the concave part may be effectively improved.

In some embodiments, in the thickness direction, the fixing part covers at least a part of the first welding part, and the fixing part and the first welding part are arranged in a spaced manner.

In above technical solution, the first part covers at least a part of the first welding part in the thickness direction of the end cover, the fixing part and the first welding part are arranged in a spaced manner; according to such structure, the pressure relief mechanism is prevented from being interfered by the first welding part in the process of welding the fixing part and the end cover, and the welding quality of the outer circumferential wall of the fixing part and the inner circumferential wall of the concave part may be effectively improved.

In some embodiments, the pressure relief mechanism and the connecting part are arranged along the thickness direction in a laminated manner, and the pressure relief mechanism is welded to the connecting part to form the second welding part.

In above technical solution, the pressure relief mechanism and the connecting part are arranged along the thickness direction in a laminated manner and are welded to form the second welding part, the firmness of the pressure relief mechanism and the end cover after welding is guaranteed, and the welding efficiency of the pressure relief mechanism and the end cover may be effectively improved.

In some embodiments, the connecting part is provided with a through hole penetrating through the connecting part; the pressure relief mechanism covers the through hole, and the through hole is for communicating the concave part with the internal of the battery cell.

In above technical solution, the connecting part is provided with the through hole penetrating through the connecting part, and the through hole is provided for releasing stress generated when the connecting part is welded to the first tab. The pressure relief mechanism covers the through hole, the through hole is configured to communicate the internal of the battery cell with the concave part, and the internal pressure of the battery cell may be released through the through hole when the pressure relief mechanism is actuated.

In some embodiments, the through hole is configured to inject an electrolyte solution into the internal of the battery cell.

In above technical solution, the through hole is configured to inject the electrolyte solution into the internal of the battery cell, the through hole is an electrolyte solution injection hole, that is, the electrolyte solution may be injected to the internal of the battery cell through the through hole.

In some embodiments, the connecting part is welded to the first tab to form two first welding parts, the two first welding parts are located at two sides of the through hole along a first direction, and the first direction is perpendicular to the thickness direction.

In above technical solution, the connecting part is welded to the first tab to form two first welding parts, the two first welding parts are located at the two sides of the through hole along the first direction perpendicular to the thickness direction of the end cover, and the two first welding parts may both play a role in connecting the first tab to the connecting part, and the firmness of the connecting part and the first tab after welding is improved.

In some embodiments, the pressure relief mechanism is completely accommodated in the concave part.

In above technical solution, the pressure relief mechanism is completely accommodated in the concave part without occupying a space outside the concave part, the overall volume the battery cell is reduced, and the energy density of the battery is favorably improved.

In some embodiments, a diameter of the pressure relief mechanism is not less than ⅓ of that of the end cover.

In above technical solution, due to the fact that the diameter of the pressure relief mechanism is not less than ⅓ of that of the end cover, the diameter of the pressure relief mechanism is relatively large, and the pressure relief capacity of the pressure relief mechanism is improved.

In a second aspect, the embodiments of the present application provide a battery, which includes a battery cell provided in any one of the embodiments in the first aspect; and a box body for accommodating the battery cell.

In a third aspect, the embodiments of the present application provide an electric apparatus, which includes a battery provided bin any one of the embodiments in the second aspect.

In a fourth aspect, the embodiments of the present application provide a manufacturing method of a battery cell, the method includes: providing an electrode assembly, the electrode assembly has a first tab; providing a housing with an opening; providing a pressure relief mechanism, the pressure relief mechanism being configured to be actuated when an internal pressure or temperature of the battery cell reaches a threshold value, thus releasing the internal pressure; providing an end cover, the end cover being provided with a concave part, and provided with a connecting part at the bottom of the concave part; accommodating the electrode assembly in the housing; covering the opening with the end cover; welding the first connecting part to the first tab to form a first welding part; installing the pressure relief mechanism in the end cover, thus making at least a part of the pressure relief mechanism be accommodated in the concave part, and making the pressure relief mechanism cover the first welding part in a thickness direction of the end cover; where the concave part is recessed from one side, away from the electrode assembly, of the end cover along a direction facing the electrode assembly.

In a fifth aspect, the embodiments of the present application provide a manufacturing apparatus of a battery cell, the manufacturing apparatus includes: a first providing device for providing an electrode assembly, the electrode assembly having a first tab; a second providing device for providing a housing, the housing having an opening; a third providing device for providing a pressure relief mechanism, where the pressure relief mechanism is configured to be actuated when an internal pressure or temperature of the battery cell reaches a threshold value, thus releasing the internal pressure; a fourth providing device for providing an end cover, where the end cover is provided with a concave part, and is provided with a connecting part at the bottom of the concave part; an assembling device for accommodating the electrode assembly in the housing; covering the opening with the end cover; welding the first connecting part to the first tab to form a first welding part; and installing the pressure relief mechanism in the end cover, thus making at least a part of the pressure relief mechanism be accommodated in the concave part, and making the pressure relief mechanism cover the first welding part in a thickness direction of the end cover; where the concave part is recessed from one side, away from the electrode assembly, of the end cover along a direction facing the electrode assembly.

BRIEF DESCRIPTION OF DRAWINGS

To describe the technical solutions in the embodiments of the present application more clearly, the following briefly introduces the accompanying drawings required for describing the embodiments. It should be understood that the following accompanying drawings show merely certain embodiments of the present application, and thus should not be considered as limitation to the scope. Those of ordinary skill in the art may still derive other accompanying drawings from these accompanying drawings without creative efforts.

Figure 1:
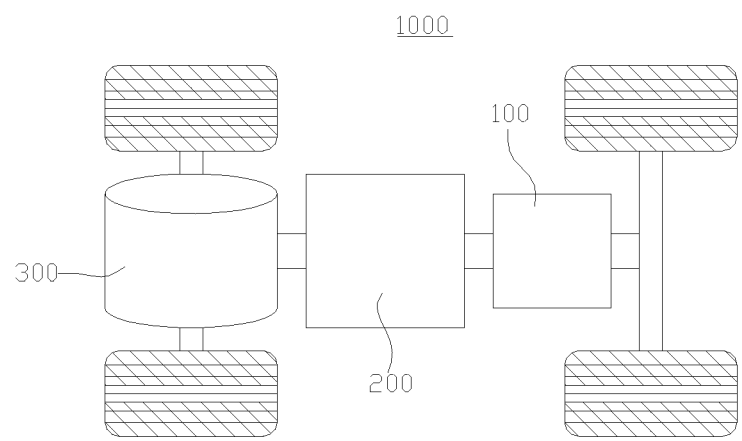
FIG. 1 is a structure diagram of a vehicle in accordance with some embodiments of the present application.

In the drawings: 10—box body; 11—first portion; 12—second portion; 13—accommodating space; 20—battery cell; 21—electrode assembly; 211—main body; 212—first tab; 213—second tab; 214—center hole; 22—housing; 221—housing body; 222—cover body; 23—pressure relief mechanism; 231—notch groove; 232—second outer surface; 233—fixing part; 234—pressure relief part; 235—avoidance space; 24—end cover; 241—concave part; 2411—bottom surface; 242—connecting part; 2421—through hole; 243—cover body; 2431—first outer surface; 2432—first inner surface; 244—convex part; 2441—abutting surface; 25—first welding part; 26—electrode terminal; 27—current collecting component; 28—insulator; 29—second welding part; 100—battery; 200—controller; 300—motor; 1000—vehicle; 1100—first providing device; 1200—second providing device; 1300—third providing device; 1400—fourth providing device; 1500—assembling device; 2000—manufacturing apparatus; Z-thickness direction; X-first direction.

DETAILED DESCRIPTION OF EMBODIMENTS

To make the objectives, technical solutions, and advantages of the embodiments of the present application more clearly, the technical solutions in the embodiments of the present application will be clearly and fully described below with reference to the accompanying drawings in the embodiments of the present application. Apparently, the described embodiments are a part of rather than all embodiments of the present application. Based on the embodiments in the present application, all other embodiments obtained by those of ordinary skill in the art without creative work shall fall within the scope of protection of the present application.

Unless defined otherwise, all technical and scientific terms configured here have the same meaning as commonly understood by those of ordinary skill in the technical field to which this application belongs; the terms configured in the description of the application in the present application is for the purpose of describing particular embodiments only and is not intended to limit the present application; the terms "include" and "have" and any variations thereof in the description and claims of the present application and in the description of the accompanying drawings above are intended to cover a non-exclusive inclusion. The terms "first," "second," and the like in the description and claims of the present application or accompanying drawings above are for distinguishing different objects and not for describing a particular sequence or primary-secondary relationship.

References to "embodiments" in the present application mean that particular features, structures or characteristics described in conjunction with the embodiments may be included in at least one embodiment of the present application. The appearances of the phrase in various places in the specification are not necessarily all referring to the same embodiment, nor are separate or alternative embodiments mutually exclusive of other embodiments.

In the description of the present application, it should be noted that, unless expressly specified and limited otherwise, the terms "installed", "connected", "connection", "attached" are to be construed broadly, for example, may be fixed connection, may be detachable connection, or may be integral connection; may be direct connection, may be indirect connection through an intermediate medium, or may be internal communication of two elements. The specific meanings of the above terms in the present application may be understood on a case-by-case basis for those of ordinary skill in the art.

In the embodiments of the present application, like reference numerals refer to like members, and detailed description of like members is omitted in different embodiments for brevity. It should be understood that the dimensions such as thickness, length, width, and the like of the various members in the embodiments of the present application, as well as the overall thickness, length, width, and the like of the integrated device, shown in the accompanying drawings are merely illustrative and should not be construed as limiting the present application.

"A plurality of" in the present application refers to more than two (including two).

In the present application, the battery cell may include a lithium-ion secondary battery, a lithium-ion primary battery, a lithium-sulfur battery, a sodium lithium-ion battery, a sodium-ion battery or a magnesium-ion battery, and the like, which is not limited in the embodiments of the present application. The battery cell may be cylindrical, flat, or other shapes, which is not limited in the embodiments of the present application. In general, the battery cell is divided into three types according to a packaging mode: a cylindrical battery cell, a square battery cell, and a soft package battery cell, which is also not limited in the embodiments of the application.

The battery provided by the embodiments of the present application refers to a single physical module including one or more battery cells to provide higher voltage or capacity. For example, the battery mentioned in the present application may include a battery module, or a battery pack, and the like. The battery generally includes a box body for packaging one or more battery cells. The box body may prevent liquid or other foreign matters from affecting charging or discharging of the battery cell.

The battery cell includes an electrode assembly and an electrolyte solution, and the electrode assembly is composed of a positive plate, a negative plate, and a separator. The battery cell works mainly on the movement of metal ions between the positive plate and the negative plate. The positive plate includes a positive current collector and a positive active material layer, the positive active material layer is coated on a surface of the positive current collector, and the positive current collector uncoated with the positive active material layer protrudes out of the positive current collector coated with the positive active material layer, and the positive current collector uncoated with the positive electrode active material layer acts as a positive pole tab. Taking the lithium-ion battery as an example, the positive current collector may be made of aluminum, and the positive active material may be lithium cobalt oxide, lithium iron phosphate, ternary lithium, or lithium manganate. The negative plate includes a negative current collector and a negative active material layer, the negative active material layer is coated on a surface of the negative current collector, and the negative current collector uncoated with the negative active material layer protrudes out of the negative current collector coated with the negative active material layer, and the negative current collector uncoated with the negative electrode active material layer acts as a negative electrode tab. The negative current collector may be made of copper, and the negative active material may be carbon or silicon. To guarantee that no fusing occurs while a large current passes through, a plurality of positive electrode tabs are laminated together, and a plurality of negative electrode tabs are laminated together. The separator may be made of polypropylene (PP), or polyethylene (PE), and the like. In addition, the electrode assembly may be of a wound structure or may be of a laminated structure, and embodiments of the present application are not limited thereto.

Design factors in multiple aspects, such as performance parameters of energy density, cycle life, discharge capacity, charge and discharge multiplying power and the like, need to be considered at the same time in the development of the battery technology, and in addition, the safety of the battery needs to be considered.

For battery cells, the major safety hazards arise from the charging and discharging process, as well as the appropriate ambient temperature design. In order to effectively avoid unnecessary losses, there are generally at least triple protection measures for battery cells. Specifically, the protection measures at least include a switching element, selection of an appropriate separator material, and a pressure relief mechanism. The switching element refers to an element capable of stopping charging or discharging of the battery when the temperature or resistance in the battery cell reaches a certain threshold value. The separator is for separating the positive plate from the negative plate, micron-scale (even nano-scale) micropores attached to the separator may be automatically dissolved when the temperature rises to a certain value, and thus the metal ions cannot pass through the separator, and the internal reaction of the battery cell is terminated.

The pressure relief mechanism refers to an element or member which is actuated when the internal pressure or temperature of the battery cell reaches a preset threshold value, thus releasing the internal pressure or temperature. The threshold value design is different according to different design requirements. The threshold value may depend on materials of one or more of the positive plate, the negative plate, the electrolyte solution, and the separator in the battery cell. The pressure relief mechanism may adopt the forms as an explosion-proof valve, a rupture disc, an air valve, a pressure relief valve or a safety valve, and may specifically adopt a pressure-sensitive or temperature-sensitive element or structure, i.e., when the internal pressure or temperature of the battery cell reaches a preset threshold value, the pressure relief mechanism executes action or a weak structure arranged in the pressure relief mechanism is damaged, thus forming an opening or a channel through which the internal pressure or temperature may be released.

"Actuation" mentioned in the present application means that the pressure relief mechanism generates action or is activated to a certain state, thus releasing the internal pressure and temperature of the battery cell. The action generated by the pressure relief mechanism may include but is not limited to: at least a part of the pressure relief part is cracked, broken, torn, opened, or the like. When the pressure relief mechanism is actuated, the internal high-temperature and high-pressure matter of the battery cell may be discharged outwards from the position of actuation as an emission. In this way, it is possible to prevent potentially more serious accidents from occurring by allowing pressure and temperature relief from the battery cells under controlled pressure or temperature.

The emission from the battery cell mentioned in the present application includes, but is not limited to, an electrolyte solution, dissolved or split positive and negative plates, fragments of the separator, high temperature and high pressure gases produced by reactions, flames, and the like.

The inventor discovers that, in the battery cell, the pressure relief capacity (e.g., pressure relief efficiency) of the pressure relief mechanism is relatively poor, pressure relief would not be achieved in time, the battery cell is prone to exploding, firing, and the like, and the safety of the battery cell is affected. The inventor further discovers that for a common battery cell, a pressure relief mechanism is installed on an end cover, the end cover is provided with a welding groove, the welding groove is located at an outer side of the pressure relief mechanism, the end cover is welded to a tab of an electrode assembly at a position of the welding groove to form a welding part for connecting the end cover to the tab together. As the welding part is located at the outer side of the pressure relief mechanism, the dimension of the pressure relief mechanism cannot be increased due to the limitation of the welding part, and thus the pressure relief capacity of the pressure relief mechanism is insufficient.

To this end, the embodiments of the present application provide a technical solution. By providing a concave part on the end cover, the concave part is recessed from one side, away from the electrode assembly, of the end cover along a direction facing the electrode assembly; the concave part is for accommodating at least a part of the pressure relief mechanism, the end cover is provided with a connecting part at the bottom of the concave part, the connecting part is welded to the first tab to form a first welding part, the pressure relief mechanism covers the first welding part in the thickness direction of the end cover, thus the dimension of the pressure relief mechanism in the direction perpendicular to the thickness direction of the end cover is no longer limited by the first welding part, the dimensions of the concave part and the pressure relief mechanism may be increased according to demands, the pressure relief capacity of the pressure relief mechanism is favorably improved, and the safety of the battery cell is improved.

The technical solution described in the embodiments of the present application are suitable for a battery and an electric apparatus using the battery.

The electric apparatus may be vehicles, mobile phones, portable apparatuses, notebook computers, ships, spacecrafts, electric toys, electric tools, and the like. The vehicles may be gasoline vehicles, gas vehicles, or new energy vehicles, and the new energy vehicles may be battery electric vehicles, hybrid electric vehicles, or range-extended electric vehicles; the spacecrafts include airplanes, rockets, space shuttles, spacecrafts and the like, the electric toys include fixed or mobile electric toys, such as game consoles, electric vehicle toys, electric ship toys, electric airplane toys, and the like; the electric tools include metal cutting electric tools, grinding electric tools, assembly electric tools, and railway electric tools, such as electric drill, an electric grinding machine, an electric wrench, an electric screwdriver, an electric hammer, an electric impact drill, a concrete vibrator and an electric planer. The embodiments of the present application have no special limitation on the electric apparatuses.

The following embodiments are described for convenience of explanation, for example, the electric apparatus is a vehicle.

Please refer to FIG. 1, the FIG. 1 is a structure diagram of a vehicle 1000 in accordance with some embodiments of the present application, a battery 100 is arranged in the vehicle 1000, and the battery 100 may be arranged at the bottom or head or tail of the vehicle 1000. The battery 100 may be configured to power supply of the vehicle 1000, for example, the battery 100 may act as an operational power source of the vehicle 1000.

The vehicle 1000 may further include a controller 200 and a motor 300, the controller 200 is for controlling the battery 100 to supply power to the motor 300, for example, for operating power needs during startup, navigation, and driving of the vehicle 1000.

In some embodiments of the present application, the battery 100 may not only act as an operational power source of the vehicle 1000, but also as a driving power source of the vehicle 1000, to provide driving power for the vehicle 1000 instead of or partially instead of fuel oil or natural gas.

Figure 2:
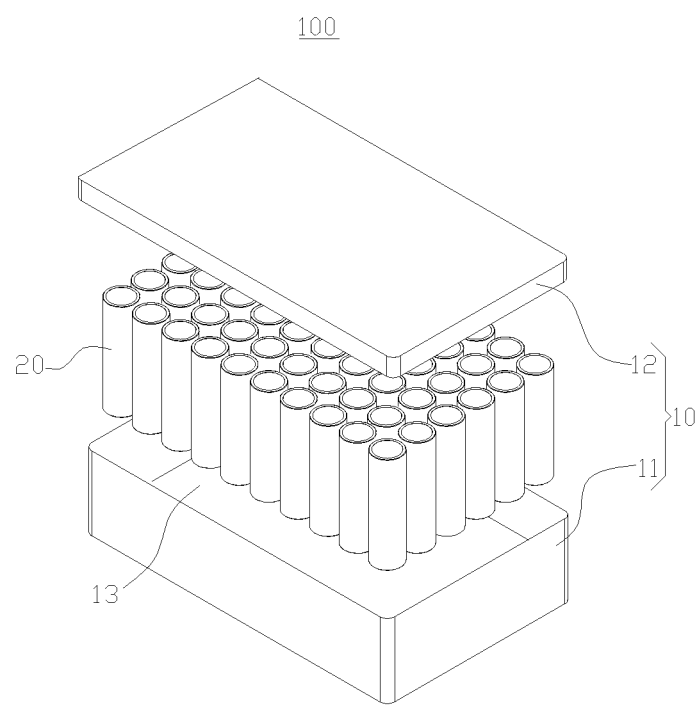
FIG. 2 is a structure diagram of a battery in accordance with some embodiments of the present application.

In some embodiments, please refer to FIG. 2, FIG. 2 is a structure diagram of a battery 100 in accordance with some embodiments of the present application. The battery 100 includes a box body 10 and a battery cell 20, and the box body 10 is for accommodating the battery cell 20.

The box body 10 may include a first portion 11 and a second portion 12, the first portion 11 and the second portion 12 are mutually closed to define an accommodating space 13 for accommodating the battery cell 20. The first portion 11 and the second portion 12 may be of a variety of shapes, such as a cuboid, a cylinder, or the like. The first portion 11 may be of a hollow structure with one side open, the second portion 12 may also be of a hollow structure with one side open, the open side of the second portion 12 covers the open side of the first portion 11, thus forming the box body 10 with the accommodating space 13. As shown in FIG. 2, it may be that the first portion 11 is of a hollow structure with one side open, and the second portion 12 is of a plate-shaped structure, the second portion 12 covers the open side of the first portion 11, thus forming the box body 10 with the accommodating space 13.

Sealing of the first portion 11 and the second portion 12 may be achieved through a sealing element, and the sealing element may be a sealing ring, sealant, and the like.

In the battery 100, one or more battery cells 20 may be present, that is, one or more battery cells 20 may be present in the box body 10. If a plurality of battery cells 20 are present, the plurality of battery cells 20 may be connected in series or in parallel or in series-parallel mode. Where the series-parallel connection means that the plurality of battery cells 20 are connected in series as well as in parallel. In some embodiments, the battery 100 may include a bus member through which the plurality of battery cells 20 may be electrically connected to achieve series or parallel or series-parallel connection of the plurality of battery cells 20.

The bus member may be a metal conductor, such as, copper, iron, aluminum, steel, aluminum alloy, or the like.

Figure 3:
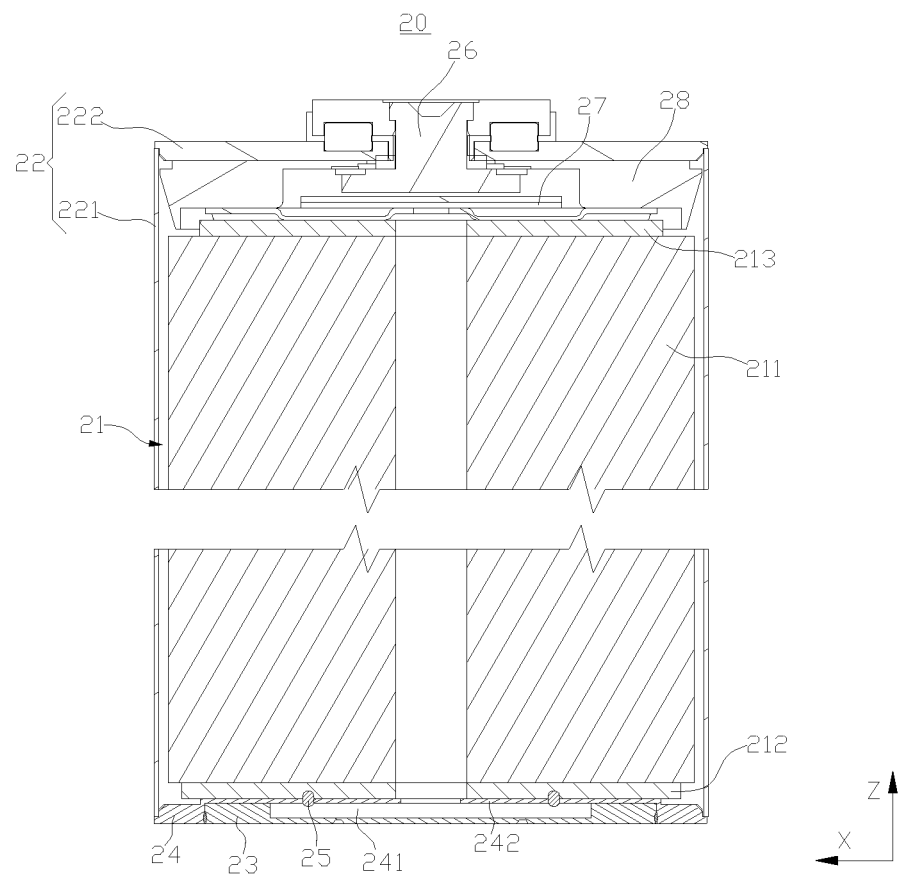
FIG. 3 is a full section view of a battery cell in accordance with some embodiments of the present application.

Please refer to FIG. 3, FIG. 3 is a full section view of a battery cell 20 in accordance with some embodiments of the present application. The battery cell 20 may include an electrode assembly 21, a housing 22, a pressure relief mechanism 23, and an end cover 24. The housing 22 is provided with an opening and is for accommodating the electrode assembly 21, the electrode assembly 21 is provided with a first tab 212, the pressure relief mechanism 23 is for being actuated when an internal pressure or temperature of the battery cell 20 reaches a threshold value, thus releasing the internal pressure; the end cover 24 is for covering the opening, the end cover 24 is provided with a concave part 241, the concave part 241 is recessed from one side, away from the electrode assembly 21, of the end cover 24 along a direction facing the electrode assembly 21, and the concave part 241 is for accommodating at least a part of the pressure relief mechanism 23. Where the end cover 24 is provided with a connecting part 242 at the bottom of the concave part 241, the connecting part 242 is for being welded to the first tab 212 to form a first welding part 25, and the pressure relief mechanism 23 covers the first welding part 25 in the thickness direction Z of the end cover 24.

In the battery cell 20 with the structure, due to the fact that the end cover 24 is provided with the connecting part 242 at the bottom of the concave part 241, the connecting part 242 is welded to the first tab 212 to form the first welding part 25, the pressure relief mechanism 23 covers the first welding part 25 in the thickness direction Z of the end cover 24, and thus the first welding part 25 and the pressure relief mechanism 23 are distributed in the thickness direction Z of the end cover 24; the dimension of the pressure relief mechanism 23 would not be limited by the first welding part 25 in the direction perpendicular to the thickness direction Z of the end cover 24, the dimensions of the concave part 241 and the pressure relief mechanism 23 may be increased according to demands, the pressure relief capacity of the pressure relief mechanism 23 is favorably improved, and the safety of the battery cell 20 is improved.

The first welding part 25 is a weld mark portion after the connecting part 242 is welded to the first tab 212, that is, a portion where the connecting part 242 and the first tab 212 are connected together after welding. The connecting part 242 is welded to the first tab 212 to form the first welding part 25, it may be understood that the connecting part 242 is connected to the first tab 212 through the first welding part 25. Certainly, the connecting part 242 is connected to the first tab 212 through the first welding part 25, thus the electric connection of the first tab 212 and the end cover 24 may be achieved, and the end cover 24 may act as an output pole of the battery cell 20. Certainly, the end cover 24 may be a positive output pole of the battery cell 20, or may be a negative output pole of the battery cell 20.

The first welding part 25 formed by welding the connecting part 242 to the first tab 212 may be one or more.

It should be understood that the end cover 24 is provided with the connecting part 242 at the bottom of the concave part 241, that is, a portion of the end cover 24 from a bottom surface 2411 of the concave part 241 to the surface of the end cover 24 along a recessed direction of the concave part 241 is the connecting part 242. The pressure relief mechanism 23 is at least partially accommodated in the concave part 241, it may be that the pressure relief mechanism 23 is partially accommodated in the concave part 241, or the pressure relief mechanism 23 is entirely and completely accommodated in the concave part 241.

In the embodiments of the present application, the end cover 24 covers the opening of the housing 22, the end cover 24 and the housing 22 jointly defines a sealing space which is for accommodating the electrode assembly 21 and an electrolyte, and the electrolyte may be an electrolyte solution.

In some embodiments, the electrode assembly 21 may further include a main body 211 and a second tab 213, the first tab 212 and the second tab 213 both protrude out of the main body 211. The main body 211 may include a positive plate, a negative plate, and a separator. The main body 211 may be of a wound structure formed by winding the positive plate, the separator, and the negative plate; the main body 211 may also be of a laminated structure formed by laminating the positive plate, the separator, and the negative plate.

The main body 211 may be of a cylindrical structure, or may be a flat structure. If the main body 211 is of a cylindrical structure, the entire electrode assembly 21 is also basically of a cylindrical structure; if the main body 211 has a flat structure, the entire electrode assembly 21 is basically of a flat structure.

The positive plate includes a positive current collector and positive active material layers coated on two opposite sides of the positive current collector. The negative plate includes a negative current collector and negative active material layers coated on two opposite sides of the negative current collector. The first tab 212 and the second tab 213 are opposite in polarity, it may be that the first tab 212 is a positive tab, and the second tab 213 is a negative tab, or it may be that the first tab 212 is a negative tab, and the second tab 213 is a positive tab. The main body 211 may be a portion of the electrode assembly 21 corresponding to a region of a pole plate coated with the active material layer, the negative tab may be a portion of the negative plate uncoated with the active material layer, and the positive tab may be a portion of the positive plate uncoated with the active material layer.

In the electrode assembly 21, the first tab 212 and the second tab 213 may be arranged at the same side of the main body 211, or may be located at two opposite sides of the main body 211 respectively. As shown in FIG. 3, take the main body 211 as a cylinder as an example, in the axial direction of the main body 211, the first tab 212 and the second tab 213 are respectively located at two sides of the main body 211.

In some embodiments, the battery cell 20 may further include an electrode terminal 26; the electrode terminal 26 is installed on the housing 22; the electrode terminal 26 and the end cover 24 are located at two opposite ends of the housing 22 respectively, and the electrode terminal 26 is for being electrically connected to the second tab 213.

The electrode terminal 26 and the end cover 24 respectively act as two output poles of the battery cell 20; it may be that the electrode terminal 26 is a positive output pole, and the end cover 24 is a negative output pole; or it may be that the electrode terminal 26 is a negative output pole, and the end cover 24 is a positive output pole. Certainly, if the first tab 212 is the positive tab and the second tab 213 is the negative tab, the end cover 24 is the positive output pole, and the electrode terminal 26 is the negative output pole; if the first tab 212 is the negative tab and the second tab 213 is the positive tab, the end cover 24 is the negative output pole, and the electrode terminal 26 is the positive output pole.

In the case that the plurality of battery cells 20 are electrically connected through the bus member, if one end of the bus member is connected to the electrode terminal 26 of one of the battery cells 20, the other end of the bus member is connected to the end cover 24 of another battery cell 20, and thus the series connection of the two battery cells 20 is achieved; if the electrode terminals 26 of two battery cells 20 are connected through one bus member, the end covers 24 of the two battery cells 20 are connected through another bus member, and thus the parallel connection of the two battery cells 20 is achieved.

In some embodiments, the electrode terminal 26 may be directly connected to the second tab 213, for example, the electrode terminal 26 is directly welded to the second tab 213 to achieve electric connection of the electrode terminal 26 and the second tab 213. In some other embodiments, as shown in FIG. 3, the electrode terminal 26 may be indirectly connected to the second tab 213 through middle ware, for example, the electrode terminal 26 is connected to the second tab 213 through a current collecting component 27, the electrode end cover 24 and the second tab 213 may all be welded to the current collecting component 27 to achieve electric connection of the electrode terminal 26 and the second tab 213. Where the current collecting component 27 may be a metal conductor, such as copper, iron, aluminum, steel, aluminum alloy, and the like.

In the embodiments of the present application, the housing 22 may be of a variety of shapes, such as, cylinder, cuboid, and the like. The shape of the housing 22 may be determined according to a specific shape of the electrode assembly 21. For example, if the electrode assembly 21 is of a cylindrical structure, the housing 22 may adopt a cylinder structure; if the electrode assembly 21 is of a flat structure, the housing 22 may adopt a cuboid structure. If the housing 22 is of a cylindrical structure, the battery cell 20 is a cylindrical battery cell 20; and if the housing 22 is of a cuboid structure, the battery cell 20 is a square battery cell 20. Illustratively, in FIG. 3, the housing 22 is of a cylindrical structure.

In some embodiments, please continue to refer to FIG. 3, the housing 22 may include a housing body 221 and a cover body 222; the cover body 222 covers one end of the housing body 221, an opening is formed in one end, away from the cover body 222, of the housing body 221, and the end cover 24 covers the opening. Take the housing body 221 is of a cylindrical structure as an example, the cover body 222 and the end cover 24 are located at two axial ends of the housing body 221.

The electrode terminal 26 may be installed on the cover body 222, and the electrode end cover 24 is in insulated connection with the cover body 222.

Illustratively, the battery cell 20 may further include an insulator 28, the insulator 28 is located in the housing body 221, is located between the electrode assembly 21 and the cover body 222, and is for insulated isolation of the cover body 222 and the electrode assembly 21. The insulator 28 may be made of insulating materials such as rubber, plastic, and the like.

In some embodiments, the electrode terminal 26 may not be provided in the battery cell 20, and the cover body 222 may be electrically connected to the second tab 213, and the cover body 222 may act as one output pole of the battery cell 20. On this occasion, it may be that the cover body 222 and the housing body 221 are in insulated connection, or that the end cover 24 and the housing body 221 are in insulated connection to avoid short-circuiting of the positive and negative poles.

In the embodiments of the present application, the pressure relief mechanism 23 refers to an element or member which is actuated when the internal pressure or temperature of the battery cell 20 reaches a preset threshold value, thus releasing the internal pressure or temperature. The pressure relief mechanism 23 may be of a variety of structures, and may be members such as an explosion-proof valve, a rupture disc, an air valve, or a pressure relief valve, and the like.

Figure 4:
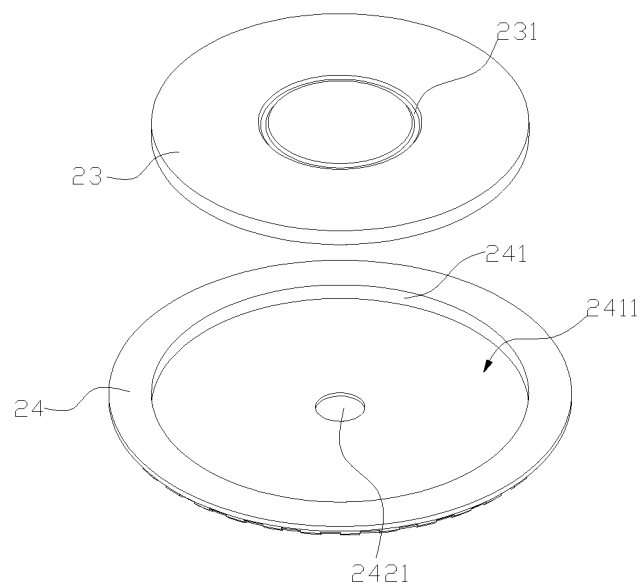
FIG. 4 is an exploded view of a pressure relief mechanism and an end cover shown in FIG. 3.

In some embodiments, please refer to FIG. 4, FIG. 4 is an exploded view of a pressure relief mechanism 23 and an end cover 24 shown in FIG. 3. The pressure relief mechanism 23 is provided with a notch groove 231, and when the internal pressure or temperature of the battery cell 20 reaches a threshold value, the pressure relief mechanism 23 is broken from the notch groove 231 to achieve actuation of the pressure relief mechanism 23, thus forming an open channel for releasing the internal pressure or temperature of the battery cell 20.

The notch groove 231 in the pressure relief mechanism 23 may be of a closed structure with the head end and the tail end connected, and may also be of a non-closed structure with the head end and the tail end away from each other. If the notch groove 231 in the pressure relief mechanism 23 is of a closed structure, when the internal pressure or temperature of the battery cell 20 reaches the threshold value, it may be that the pressure relief mechanism 23 partially falls off by taking the notch groove 231 as a boundary to release the internal pressure of the battery monomer 20; if the pressure relief mechanism 23 is of a non-closed structure, when the internal pressure or temperature of the battery cell 20 reaches the threshold value, it may be that the pressure relief mechanism 23 is partially overturned by taking the notch groove 231 as the boundary to release the internal pressure of the battery cell 20.

Illustratively, in FIG. 4, the pressure relief mechanism 23 is a rupture disc, the notch groove 231 is of an annular structure with the head end and the tail end connected, and the notch groove 231 is arranged on a surface, away from the bottom surface 2411 of the concave part 241, of the rupture disc.

The dimension of the pressure relief mechanism 23 directly affects the pressure relief capacity of the pressure relief mechanism 23. To improve the pressure relief capacity of the pressure relief mechanism 23, in some embodiments, for example, the pressure relief mechanism 23 and the end cover 24 are both circular, the diameter of the pressure relief mechanism 23 is not less than ⅓ of that of the end cover 24.

Figure 5:
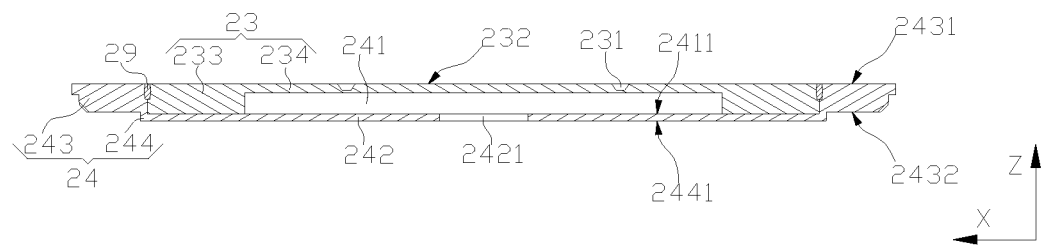
FIG. 5 is an assembly diagram of a pressure relief mechanism and an end cover shown in FIG. 4.

In some embodiments, please refer to FIG. 5, FIG. 5 is an assembly diagram of a pressure relief mechanism 23 and an end cover 24 shown in FIG. 4. The end cover 24 may include a cover main body 243 and a convex part 244. The cover main body 243 is for covering the opening, in the thickness direction Z, the cover main body 243 is provided with a first outer surface 2431 and a first inner surface 2432 which are oppositely arranged, the concave part 241 is recessed from the first outer surface 2431 along the direction facing the electrode assembly 21. The convex part 244 is located at the position where the cover main body 243 corresponds to the concave part 241, and the convex part 244 protrudes from the first inner surface 2432 along the direction facing the electrode assembly 21. Where the thickness direction Z, the convex part 244 is provided with an abutting surface 2441 facing the electrode assembly 21, the bottom surface 2411 of the concave part 241 is opposite to the abutting surface 2441, the abutting surface 2441 is for abutting against the first tab 212 (not shown in FIG. 5), and a connecting part 242 is formed between the abutting surface 2441 and the bottom surface 2411.

The convex part 244 is located at the position where the cover main body 243 corresponds to the concave part 241, and protrudes from the first inner surface 2432 along the direction facing the electrode assembly 21, and the convex part 244 may play a role in enhancing the position where the cover main body 243 is provided with the concave part 241. The connecting part 242 for being welded to the first tab 212 is formed between the abutting surface 2441 of the convex part 244 and the bottom surface 2411 of the concave part 241, the abutting surface 2441 of the convex part 244 may keep good contact with the first tab 212 when the connecting part 242 is welded to the first tab 212, thus improving an open area between the first tab 212 and the end cover 24.

The connecting part 242 is formed between the abutting surface 2441 and the bottom surface 2411 of the concave part 241, it may be understood that, in the thickness direction Z of the end cover 24, two end surfaces of the connecting part 242 are the abutting surface 2441 and the bottom surface 2411.

Optionally, in the thickness direction Z, the bottom surface 2411 is closer to the electrode assembly 21 (not shown in FIG. 5) than the first inner surface 2432. On the one hand, such structure increases the depth of concavity of the concave part 241, and then increases a space of the concave part 241 for accommodating the pressure relief mechanism 23; on the other hand, the distance from the abutting surface 2441 of the convex part 244 to the bottom surface 2411 of the concave part 241 is relatively small, i.e., the thickness of the connecting part 242 is relatively small, thus the connecting part 242 can be conveniently welded to the first tab 212 from the outside of the end cover 24, and the firmness of the connecting part 242 and the first tab 212 after welding is improved.

In other embodiments, it may be that the bottom surface 2411 is flush with the first inner surface 2432, or, in the thickness direction Z, the bottom surface 2411 is further away from the electrode assembly 21 than the first inner surface 2432.

In some embodiments, please continue to refer to FIG. 5, the pressure relief mechanism 23 is completely accommodated in the concave part 241 without occupying the space outside the concave part 241, the entire volume of the battery cell 20 is reduced, and the energy density of the battery 100 is favorably improved.

The pressure relief mechanism 23 is provided with a second outer surface 232 away from the connecting part 242, and is completely accommodated into the concave part 241, i.e., the second outer surface 232 does not exceed the first outer surface 2431 along a direction away from the connecting part 242, it may be that the second outer surface 232 is flush with the first outer surface 2431, or the second outer surface 232 is closer to the connecting part 242 than the first outer surface 2431.

In the case that the pressure relief mechanism 23 is provided with a notch groove 231, the notch groove 231 may be provided on the second outer surface 232.

Figure 6:
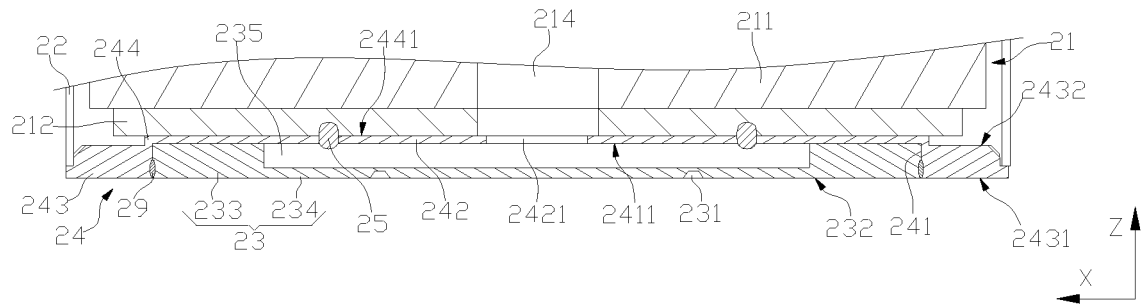
FIG. 6 is a partial view of a battery cell shown in FIG. 3.

In some embodiments, please refer to FIG. 6, FIG. 6 is a partial view of a battery cell 20 shown in FIG. 3. The connecting part 242 is provided with a through hole 2421 penetrating through the connecting part 242, the pressure relief mechanism 23 covers the through hole 2421, and the through hole 2421 is for communicating the internal of the battery cell 20 with the concave part 241.

The through hole 2421 is provided for releasing stress generated when the connecting part 242 is welded to the first tab 212. Due to the fact that the pressure relief mechanism 23 covers the through hole 2421 and the through hole 2421 communicates the internal of the battery cell 20 with the concave part 241, the internal pressure of the battery cell 20 may be released through the through hole 2421 when the pressure relief mechanism 23 is actuated. That is, the through hole 2421 may act as a pressure relief hole of the end cover 24.

Where two ends of the through hole 2421 may penetrate through the abutting surface 2441 and the bottom surface 2411 of the concave part 241 respectively, thus communicating the concave part 241 with the internal of the battery cell 20.

Illustratively, the end cover, 24, the pressure relief mechanism 23 and the concave part 241 are all circular, and the through hole 2421 and the concave part 241 are coaxially provided.

Optionally, the through hole 2421 is for injecting an electrolyte solution to the internal of the battery cell 20, the through hole 2421 is an electrolyte solution injection hole, and the electrolyte solution may be injected into the battery cell 20 through the through hole 2421.

Due to the fact that the through hole 2421 covered by the pressure relief mechanism 23 acts as the electrolyte solution injection hole, there is no need to additionally provide an electrolyte solution injection hole on the end cover 24, and the end cover 24 may provide a larger space for the pressure relief mechanism 23.

It may be understood that the pressure relief mechanism 23 is not installed in the concave part 241 of the end cover 24 when the electrolyte solution is injected to the internal of the battery cell 20 through the through hole 2421. After the electrode solution is injected to the internal of the battery cell 20, the pressure relief mechanism 23 is then installed in the concave part 241 and covers the through hole 2421.

Optionally, a center hole 214 is provided on the electrode assembly 21, and the through hole 2421 is opposite to the center hole 214. According to such structure, on the one hand, when the internal pressure or temperature of the battery cell 20 reaches a threshold value, an emission at the internal the battery cell 20 can be discharged in time through a channel formed by the center hole 214 and the through hole 2421; on the other hand, when the electrolyte solution is inject to the internal of the battery cell 20 through the through hole 2421, the electrolyte solution may quickly enter the center hole 214 to infiltrate pole plates.

Certainly, in other embodiments, the through hole 2421 may also not act as an electrolyte solution injection hole, on this occasion, to ensure normal injection of the electrolyte solution to the internal of the battery 100, an electrolyte solution injection hole may be additionally provided on the end cover 24, or an electrolyte solution injection hole may be additional provided on the cover body 222.

In some embodiments, please continue to refer to FIG. 6, the connecting part 242 is welded to the first tab 212 to form two first welding parts 25, the two welding parts 25 are located at two sides of the through hole 2421 along the first direction X, and the first direction X is perpendicular to the thickness direction Z. The two first welding parts 25 may both play a role in connecting the first tab 212 to the connecting part 242, and the firmness of the connecting part 242 and the first tab 212 after welding is improved.

In some other embodiments, the connecting part 242 is welded to the first tab 212 to form an annular first welding part 25, the first welding part 25 is arranged around the through hole 2421.

In the embodiments of the present application, the pressure relief mechanism 23 may be fixedly connected to the end cover 24 in a variety of ways, for example, the pressure relief mechanism 23 is welded to the end cover 24; as another example, the pressure relief mechanism 23 is adhered to the end cover 24.

In some embodiments, the pressure relief mechanism 23 is welded to the end cover 24 to form a second welding part 29, i.e., the pressure relief mechanism 23 is fixedly connected to the end cover 24 through the second welding part 29. The second welding part 29 is located at an outer side of the first welding part 25 along the first direction X. According to such structure, the first welding part 25 and the second welding part 29 are free of overlapping in the thickness direction Z of the end cover 24; when the pressure relief mechanism 23 is welded to the end cover 24, no second welding can be formed at a position where the first welding part 25 is located, the situation that firmness of the first connecting part 242 and the first tab 212 after welding is affected due to damage of the first welding part 25 caused by secondary welding is avoided.

Take the connecting part 242 is provided with the through hole 2421 as an example, in the first direction X, the first welding part 25 is located at the outer side of the through hole 2421, and the second welding part 29 is further away from the through hole 2421 than the first welding part 25. If the first welding part 25 is located on a first circumference and the second welding part 29 is located on a second circumference, the first circumference is located at the outer circumference of the through hole 2421, and the second circumference is located on the outer circumference of the first circumference.

When the electrolyte solution is injected to the internal of the battery cell 20 through the through hole 2421, the end cover 24 may have electrolyte solution remaining around the through hole 2421, and if the welding position of the pressure relief mechanism 23 and the end cover 24 is close to the through hole 2421 when the pressure relief mechanism 23 is welded to the end cover 24, under the influence of the electrolyte solution remaining on the end cover 24, it is easy to have a poor welding of the pressure relief mechanism 23 and the end cover 24, resulting in a low welding excellence rate. In the embodiment, due to the fact that the second welding part 29 is further away from the through hole 2421 than the first welding part 25, the welding position of the pressure relief mechanism 23 and the end cover 24 is further away from the through hole 2421, when the pressure relief mechanism 23 is welded to the end cover 24, the pressure relief mechanism 23 and the end cover 24 are not prone to being affected by the electrolyte solution remaining around the through hole 2421, firmness of the pressure relief mechanism 23 and the end cover 24 after welding is guaranteed, and the welding excellence rate is improved.

The second welding part 29 formed by welding the pressure relief mechanism 23 to the end cover 24 may be one or more.

Illustratively, the second welding part 29 may be an annular structure arranged around the through hole 2421, and the sealing of the pressure relief mechanism 23 and the end cover 24 is achieved through the second welding part 29.

In some embodiments, the pressure relief mechanism 23 may include a fixing part 233 and a pressure relief part 234. An outer circumferential wall of the fixing part 233 is welded to an inner circumferential wall of the concave part 241 to form the second welding part 29. The pressure relief part 234 is for being actuated when the internal pressure or temperature of the battery cell 20 reaches a threshold value, thus releasing the internal pressure.

The pressure relief part 234 of the pressure relief mechanism 23 is for releasing the internal pressure of the battery cell 20, and the fixing part 233 of the pressure relief mechanism 23 is for being welded and fixed to the end cover 24. Due to the fact that the outer circumferential wall of the fixing part 233 is welded to an inner circumferential wall of the concave part 241 to form the second welding part 29, the second welding part 29 is far away from the pressure relief part 234, thus reducing the risk of damaging the pressure relief part 234 in the process of welding the fixing part 233 to the end cover 24.

In the actual welding, the welding of the fixing part 233 and the end cover 24 may be achieved by butt-seam welding. In addition, in the case that the connecting part 242 is provided with the through hole 2421, due to the fact that the second welding part 29 is located at a position of a welding seam formed between the outer circumferential wall of the fixing part 233 and the inner circumferential wall of the concave part 241, the second welding part 29 is further away from the through hole 2421 in the direction perpendicular to the thickness direction of the end cover 24 to reduce the risk of poor welding of the fixing part 233 and the end cover 24 due to the electrolyte solution remaining in the concave part 241 in the process of injecting the electrolyte solution to the internal of the battery cell 20 through the through hole 2421.

In the embodiment, the notch groove 231 may be provided on the pressure relief part 234.

Optionally, the thickness of the fixing part 233 is greater than that of the pressure relief part 234, the pressure relief mechanism 23 can be conveniently actuated to release the internal pressure of the battery cell 20, and the depth of the notch groove 231 does not need to be too deep to achieve the purpose of actuating the pressure relief part 234 to release the internal pressure of the battery cell 20.

In some embodiments, the fixing part 233 is integrally located at an outer side of the first welding part 25, i.e., the fixing part 233 does not overlap with the first welding part 25 in the thickness direction Z. In the thickness direction Z, the pressure relief part 234 covers the first welding part 25, and the pressure relief part 234 and the first welding part 25 are arranged along the thickness direction in a spaced manner. According to such structure, the pressure relief mechanism 23 is prevented from being interfered by the first welding part 25 in the process of welding the fixing part 233 to the end cover 24, and the welding quality of the outer circumferential wall of the fixing part 233 and the inner circumferential wall of the concave part 241 may be effectively improved. That is, such structure may improve the welding quality of the butt-seam welding of the fixing part 233 and the end cover 24.

Optionally, the thickness of the fixing part 233 is greater than that of the pressure relief part 234, and the fixing part 233 and the pressure relief part 234 jointly defines a clearance space 235; the clearance space 235 is for avoiding the first welding part 25; in the case that the pressure relief part 234 and the first welding part 25 are arranged along the thickness direction Z in a spaced manner, the fixing part 233 may abut against the bottom surface 2411 of the concave part 241, thus facilitating the welding of the fixing part 233 and the end cover 24.

Illustratively, the fixing part 233 and the pressure relief part 234 are both of a plate-shaped structure, the surface of the fixing part 233 away from the bottom surface 2411 of the concave part 241 and the surface of the pressure relief part 234 away from the bottom surface 2411 of the concave part 241 are coplanar to form a second outer surface 232, and the second outer surface 232 is flush with the first outer surface 2431.

Figure 7:
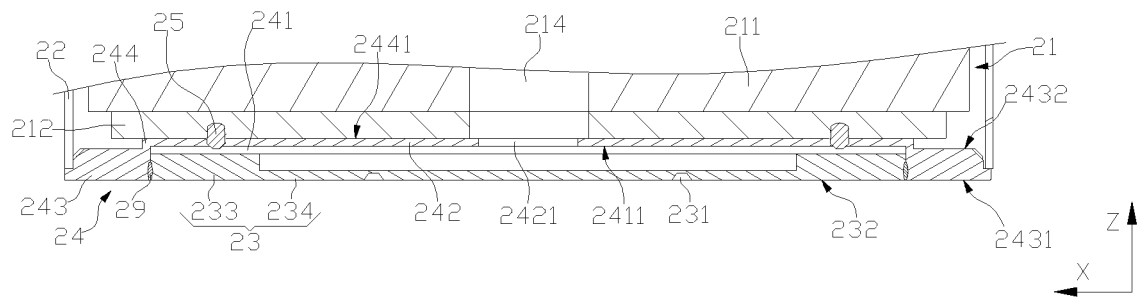
FIG. 7 is a partial view of a battery cell in accordance with some other embodiments of the present application.

In some other embodiments, please refer to FIG. 7, FIG. 7 is a partial view of a battery cell 20 in accordance with some other embodiments of the present application. In the thickness direction Z, the fixing part 233 covers at least a part of the first welding part 25, and the fixing part 233 and the first welding part 25 are arranged in a spaced manner. According to such structure, the pressure relief mechanism 23 is prevented from being interfered by the first welding part 25 in the process of welding the fixing part 233 to the end cover 24, and the welding quality of the outer circumferential wall of the fixing part 233 and the inner circumferential wall of the concave part 241 may be effectively improved.

Illustratively, the fixing part 233 completely covers the first welding part 25 in the thickness direction Z.

Figure 8:
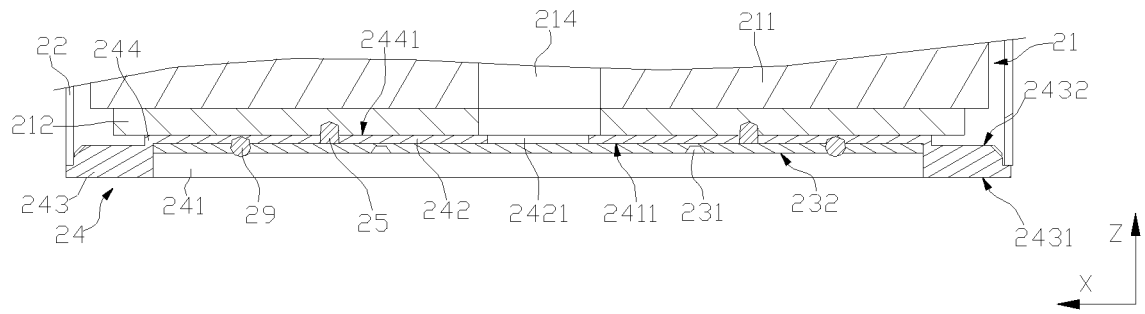
FIG. 8 is a partial view of a battery cell in accordance with yet another embodiments of the present application.

In some embodiments, please refer to FIG. 8, FIG. 8 is a partial view of a battery cell 20 in accordance with yet another embodiments of the present application. The pressure relief mechanism 23 and the connecting part 242 are arranged along the thickness direction Z in a laminated manner, the pressure relief mechanism 23 is welded to the connecting part 242 to form the second welding part 29, the firmness of the pressure relief mechanism 23 and the end cover 24 after welding is guaranteed, and the welding efficiency of the pressure relief mechanism 23 and the end cover 24 may be effectively improved.

In actual welding, the pressure relief mechanism 23 may be welded and fixed to the connecting part 242 by through-welding.

In the embodiment, the pressure relief mechanism 23 may be of a plate-shaped structure with the thickness even in a region except for the position where the notch groove 231 is provided, the second surface of the pressure relief mechanism 23 may be closer to the connecting part 242 than the first outer surface 2431 of the cover main body 243, the second welding part 29 can penetrate through the pressure relief mechanism 23 to be fixed to the connecting part 242, and the firmness of the pressure relief mechanism 23 and the end cover 24 after welding is improved.

Figure 9:
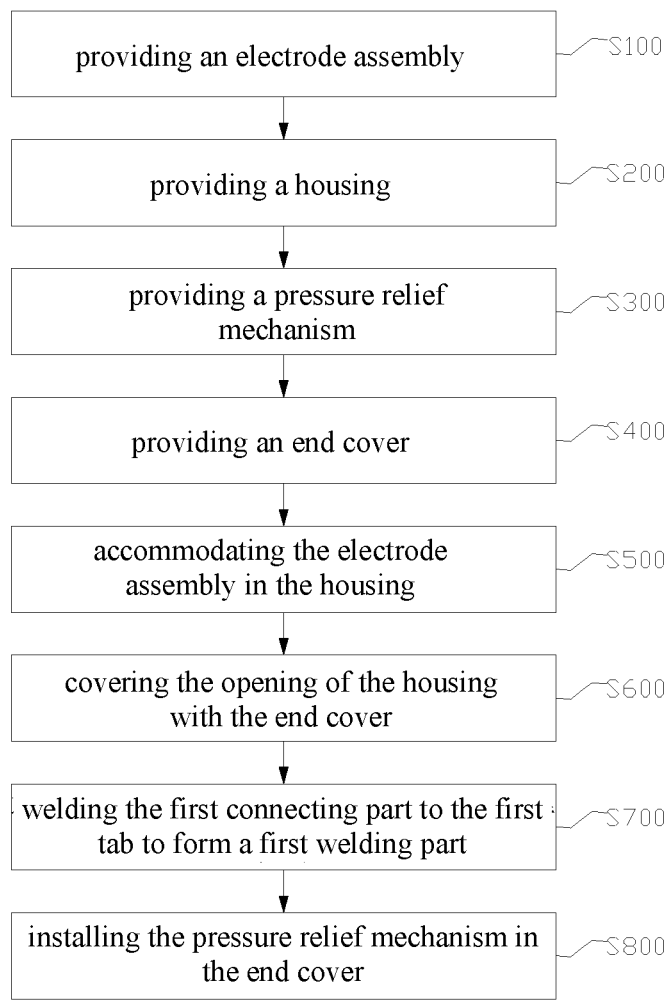
FIG. 9 is a flow diagram of a manufacturing method of a battery cell in accordance with some embodiments of the present application.

The embodiments of the present application provide a manufacturing method of a battery cell 20. Please refer to FIG. 9, FIG. 9 is a flow diagram of a manufacturing method of a battery cell 20 in accordance with some embodiments of the present application. The manufacturing method includes:

S100: providing an electrode assembly 21 with a first tab 212;

S200: providing a housing 22 with an opening;

S300: providing a pressure relief mechanism 23, the pressure relief mechanism 23 being configured to be actuated when an internal pressure or temperature of the battery cell 20 reaches a threshold value, thus releasing the internal pressure;

S400: providing an end cover 24, the end cover 24 being provided with a concave part 241, and provided with a connecting part 242 at the bottom of the concave part 241;

S500: accommodating the electrode assembly 21 in the housing 22;

S600: covering the opening of the housing 22 with the end cover 24;

S700: welding the first connecting part 242 to the first tab 212 to form a first welding part 25;

and S800: installing the pressure relief mechanism 23 in the end cover 24, thus making at least a part of the pressure relief mechanism 23 be accommodated in the concave part 241, and making the pressure relief mechanism 23 cover the first welding part 25 in a thickness direction Z of the end cover 24, where the concave part 241 is recessed from one side, away from the electrode assembly 21, of the end cover 24 along a direction facing the electrode assembly 21.

In above methods, the sequence of the of the step S100, the step S200, the step S300 and the step S400 is not limited, for example, the step S400 may be executed first, then the step S300 is executed, then the step S200 is executed, and then the step S100 is executed.

In some embodiments, the step S800 may include: placing the pressure relief mechanism 23 in the concave part 241, and welding the pressure relief mechanism 23 to the end cover 24 to form the second welding part 29.

It should be noted that a related structure of the battery cell 20 manufactured by the manufacturing method provided in various embodiments may refer to the battery cell 20 provided in various embodiments above, and will not be described in detail herein.

Figure 10:
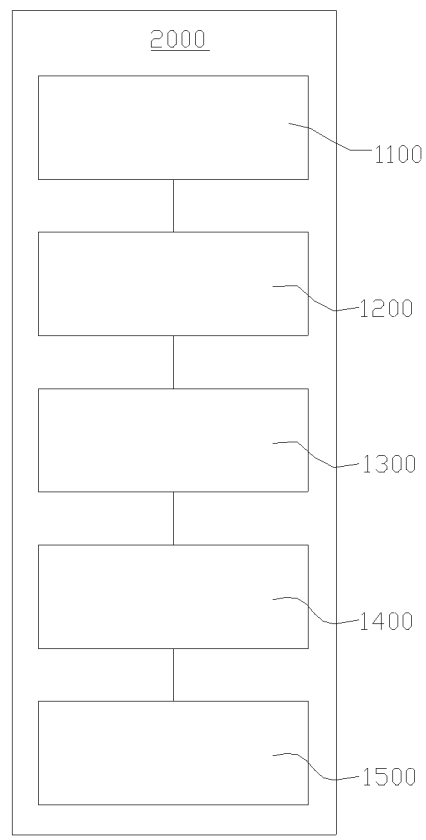
FIG. 10 is an illustrative block diagram of a manufacturing apparatus of a battery cell in accordance with some embodiments of the present application.

In addition, the embodiments of the present application further provide a manufacturing apparatus 2000 of a battery cell 20. Please refer to FIG. 10, FIG. 10 is an illustrative block diagram of a manufacturing apparatus 2000 of a battery cell 20 in accordance with some embodiments of the present application. The manufacturing apparatus 2000 includes a first providing device 1100, a second providing device 1200, a third providing device 1300, a fourth providing device 1400, and an assembling device 1500.

The first providing device 1100 is for providing an electrode assembly 21, the electrode assembly 21 having a first tab 212. The second providing device 1200 is for providing a housing 22, the housing 22 having an opening. The third providing device 1300 is for providing a pressure relief mechanism 23, where the pressure relief mechanism 23 is for being actuated when an internal pressure or temperature of the battery cell 20 reaches a threshold value, thus releasing the internal pressure. The fourth providing device 1400 is for providing an end cover 24, where the end cover 24 is provided with a concave part 241, and is provided with a connecting part 242 at the bottom of the concave part 241. The assembling device 1500 is for accommodating the electrode assembly 21 in the housing 22; covering the opening with the end cover 24; welding the connecting part 242 with the first tab 212 to form a first welding part 25; and installing the pressure relief mechanism 23 in the end cover 24, thus making at least a part of the pressure relief mechanism 23 be accommodated in the concave part 241, and making the pressure relief mechanism 23 cover the first welding part 25 in a thickness direction Z of the end cover 24. Where the concave part 241 is recessed from one side, away from the electrode assembly 21, of the end cover 24 along a direction facing the electrode assembly 21.

The assembling device 1500 may include a first assembling module, a second assembling module, a third assembling module, and a fourth assembling module; the first assembling module is for accommodating the electrode assembly 21 in the housing 22; the second assembling module is for covering the opening of the end cover 24; the third assembling module is for welding the connecting part 242 to the first tab 212 to form the first welding part 25; and the fourth assembling module is for installing the pressure relief mechanism 23 in the end cover 24.

It should be noted that a related structure of the battery cell 20 manufactured by the manufacturing apparatus 2000 provided by various embodiments may refer to the battery cell 20 provided by various embodiments above, and will not be described in detail herein.

It should be noted that the embodiments and the features in the embodiments in the present application may be combined with each other without conflict.

The above embodiments are merely illustrative of the technical solutions of the present application and are not intended to limit the present application. For those skilled in the art, various modifications and changes may be made to the present application. Any modifications, equivalents, improvements, and like made within the spirit and principles of the present application all shall be included within the scope of the present application.

What is claimed is:
1. A battery cell, comprising:
an electrode assembly with a first tab;
a housing with an opening, the housing being configured to accommodate the electrode assembly;

a pressure relief mechanism for being actuated when an internal pressure or temperature of the battery cell reaches a threshold value, thus releasing the internal pressure;

an end cover for covering the opening, wherein the end cover is provided with a concave part, the concave part is recessed from one side, away from the electrode assembly, of the end cover along a direction facing the electrode assembly, and the concave part is configured to accommodate at least a part of the pressure relief mechanism;

wherein the end cover is provided with a connecting part at the bottom of the concave part, the connecting part is configured to be welded to the first tab to form a first welding part, and the pressure relief mechanism covers the first welding part in a thickness direction of the end cover;

wherein the pressure relief mechanism is welded to the end cover to form a second welding part, the second welding part is located at an outer side of the first welding part along a first direction, and the first direction is perpendicular to the thickness direction.

2. The battery cell according to claim 1, wherein the end cover comprises:

a cover main body for covering the opening, in the thickness direction, the cover main body is provided with a first outer surface and a first inner surface which are oppositely arranged, and the concave part being recessed from the first outer surface along a direction facing the electrode assembly; and a convex part located at a position where the cover main body corresponds to the concave part, the convex part protruding from the first inner surface along the direction facing the electrode assembly;

wherein, in the thickness direction, the convex part is provided with an abutting surface facing the electrode assembly, a bottom surface of the concave part is opposite to the abutting surface, the abutting surface is configured to abut against the first tab, and the connecting part is formed between the abutting surface and the bottom surface.

3. The battery cell according to claim 2, wherein, in the thickness direction, the bottom surface is closer to the electrode assembly than the first inner surface; or the bottom surface is flush with the first inner surface.

4. The battery cell according to claim 1, wherein the pressure relief mechanism comprises a fixing part and a pressure relief part;

an outer peripheral wall of the fixing part is welded to an inner peripheral wall of the concave part to form the second welding part;

and the pressure relief part is configured to be actuated when the internal pressure or temperature of the battery cell reaches a threshold value, to release the internal pressure.

5. The battery cell according to claim 4, wherein a thickness of the fixing part is greater than a thickness of the pressure relief part.

6. The battery cell according to claim 4, wherein the fixing part is integrally located at an outer side of the first welding part, in the thickness direction, the pressure relief part covers the first welding part, and the pressure relief part and the first welding part are arranged along the thickness direction in a spaced manner.

7. The battery cell according to claim 4, wherein, in the thickness direction, the fixing part covers at least a part of the first welding part, and the fixing part and the first welding part are arranged in a spaced manner.

8. The battery cell according to claim 1, wherein the pressure relief mechanism and the connecting part are arranged along the thickness direction in a laminated manner, and the pressure relief mechanism is welded to the connecting part to form the second welding part.

9. The battery cell according to claim 1, wherein the connecting part is provided with a through hole penetrating through the connecting part;

the pressure relief mechanism covers the through hole, and the through hole is for communicating the concave part with an interior of the battery cell.

10. The battery cell according to claim 9, wherein the through hole is configured to inject an electrolyte solution to the interior of the battery cell.

11. The battery cell according to claim 9, wherein the connecting part is welded to the first tab to form two first welding parts, the two first welding parts are located at two sides of the through hole along a first direction, and the first direction is perpendicular to the thickness direction.

12. The battery cell according to claim 1, wherein the pressure relief mechanism is completely accommodated in the concave part.

13. The battery cell according to claim 1, wherein a diameter of the pressure relief mechanism is not less than ⅓ of a diameter that of the end cover.

14. A battery, comprising:
the battery cell according to claim 1; and
a box body for accommodating the battery cell.

15. A power consumption device, comprising the battery according to claim 14.

16. A manufacturing method of a battery cell, wherein the method comprises:

providing an electrode assembly with a first tab;
providing a housing with an opening;
providing a pressure relief mechanism, the pressure relief mechanism being configured to be actuated when an internal pressure or temperature of the battery cell reaches a threshold value, to release the internal pressure;

providing an end cover, the end cover being provided with a concave part, and provided with a connecting part at a bottom of the concave part;

accommodating the electrode assembly in the housing;
covering the opening with the end cover;
welding the first connecting part to the first tab to form a first welding part;

installing the pressure relief mechanism in the end cover, thus making at least a part of the pressure relief mechanism be accommodated in the concave part, and making the pressure relief mechanism cover the first welding part in a thickness direction of the end cover;

wherein the concave part is recessed from one side, away from the electrode assembly, of the end cover along a direction facing the electrode assembly;

wherein the pressure relief mechanism is welded to the end cover to form a second welding part, the second welding part is located at an outer side of the first welding part along a first direction, and the first direction is perpendicular to the thickness direction.

17. A manufacturing apparatus of a battery cell, wherein the manufacturing apparatus comprises:

a first providing device for providing an electrode assembly, the electrode assembly having a first tab;
a second providing device for providing a housing, the housing having an opening;

a third providing device for providing a pressure relief mechanism, wherein the pressure relief mechanism is configured to be actuated when an internal pressure or temperature of the battery cell reaches a threshold value, to release the internal pressure;

a fourth providing device for providing an end cover, wherein the end cover is provided with a concave part, and is provided with a connecting part at a bottom of the concave part;

an assembling device for accommodating the electrode assembly in the housing; covering the opening with the end cover; welding the first connecting part to the first tab to form a first welding part; and installing the pressure relief mechanism in the end cover, thus making at least a part of the pressure relief mechanism be accommodated in the concave part, and making the pressure relief mechanism cover the first welding part in a thickness direction of the end cover;

wherein the concave part is recessed from one side, away from the electrode assembly, of the end cover along a direction facing the electrode assembly;

wherein the pressure relief mechanism is welded to the end cover to form a second welding part, the second welding part is located at an outer side of the first welding part along a first direction, and the first direction is perpendicular to the thickness direction.

* * * * *